US007409116B1

(12) United States Patent
Mackie et al.

(10) Patent No.: US 7,409,116 B1
(45) Date of Patent: Aug. 5, 2008

(54) RF TO OPTICAL CONVERTER FOR RF IMAGING WITH OPTICAL SENSORS

(75) Inventors: David M. Mackie, College Park, MD (US); Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/709,732

(22) Filed: Feb. 23, 2007

(51) Int. Cl.
G02F 1/295 (2006.01)
(52) U.S. Cl. ............................................. 385/4; 385/8
(58) Field of Classification Search ........................ None
See application file for complete search history.

(56) References Cited

U.S. PATENT DOCUMENTS

2006/0076518 A1* 4/2006 Barker et al. ............ 250/504 R
2006/0120679 A1* 6/2006 Hyde ......................... 385/129
2006/0222281 A1* 10/2006 Deliwala ....................... 385/8

OTHER PUBLICATIONS

Tribe, W. et al., Hidden object detection: security applications of terahertz technology, Proc. SPIE, vol. 5354, 2004, pp. 168-176.
Lettington, A. et al., "Passive millimetre-wave imaging architectures," J. Optics A: Pure and Applied Optics, vol. 5, Issue 4, 2003, pp. S103-S110.
Siebert, K. et al., "Continuous-wave all-optoelectronic terahertz imaging," Appl. Phys. Lett., vol. 80, No. 16, Apr. 22, 2002, pp. 3003-3005.
Gregory, I. et al., "Continuous-wave terahertz imaging using diode lasers," Proc. SPIE, vol. 5354, 2004, pp. 139-150.
Rendina, I. et al., "All-silicon optically-interrogated power sensor for microwaves and millimetre waves," Electronics Lett., vol. 35, No. 20, Sep. 30, 1999, pp. 1748-1749.
Sasaki, A. et al., "Millimeter-wave imaging using an electrooptic detector as a harmonic mixer," IEEE Journal of Selected Topics in Quantum Electronics, vol. 6, No. 5, Sep./Oct. 2000, pp. 735-740.
Chen, C. et al., "Electromagnetic design of an all-diffractive millimeter-wave imaging system," Applied Optics, vol. 43, No. 12, Apr. 20, 2004, pp. 2431-2438.

* cited by examiner

Primary Examiner—Sung H Pak
(74) Attorney, Agent, or Firm—William W. Randolph; Edward L. Stolarun

(57) ABSTRACT

A radio frequency (RF) to optical converter for RF imaging, wherein the converter comprises an array of RF antenna pixels adapted to receive RF signals, wherein the RF antenna pixels are adapted to facilitate RF resonance of the received RF signals; a photonic band gap (PBG) layer connected to the array of RF antenna pixels, the PBG layer comprising at least two materials, arranged in a photonic crystal (PC), wherein at least one of the materials comprises an electro-optic (EO) material, wherein the EO material is adapted to use the RF resonant signals to produce changes in optical properties of the EO material, and wherein the PC is adapted to use changes in optical properties of the EO material to produce enhanced changes in optical properties of the PBG layer; and an RF ground plane connected to the PBG layer.

24 Claims, 5 Drawing Sheets

RF TO OPTICAL CONVERTER FOR RF IMAGING WITH OPTICAL SENSORS

GOVERNMENT INTEREST

The embodiments described herein may be manufactured, used, and/or licensed by or for the United States Government without the payments of royalties thereon.

BACKGROUND

1. Technical Field

The embodiments herein generally relate to radio frequency (RF) and photonics, and more particularly to near-millimeter wave (NMMW), terahertz (TH), and microwave (MW) imaging for use in remote sensing (either active or passive, and especially through obscurants), security scanning, medical scanning, and related applications.

2. Description of the Related Art

Within the context of the embodiments herein, "RF" includes MW, NMMW, and TH radiation. By historical convention, these wavelengths are commonly referred to in the literature as RF, even though the wavelengths are much shorter than those used for radio.

Imaging systems may be active, meaning that they include a source of radiation other than the object being viewed. Commonplace examples of active imaging systems are x-ray machines and cameras with a flash. Imaging systems may also be passive, meaning that they utilize only ambient radiation coming from the object of interest. Commonplace examples are cameras and camcorders using only daylight, and infrared viewers for rifle sights, medical imaging, or satellite imagery.

RF active and passive imaging systems are complementary to visible light and infrared (IR) imaging because they encompass wavelength "windows" for transmission through fog, rain, and certain materials, and can be used day and night. Also, certain RF wavelengths may have absorption spectrum features for certain chemical or biochemical species. Therefore, RF imaging systems have important applications for the military, homeland security, civilian aviation, automobile safety, and medical diagnosis.

Generally, there have been a limited number of previously known RF imaging systems. Typically, these have been and are being developed with traditional radar technology that involves sophisticated and expensive electronic circuitry and systems. In addition, previously known systems have generally not proven wholly satisfactory in operation. An important restriction so far has been in the small number of pixels, which is due to the need in these previous systems to directly couple each pixel to a RF detector containing active circuitry to down-convert the very high frequency RF to a low frequency signal that can be handled with conventional electronics. These RF detectors tend to be expensive, heavy, and consume large amounts of electrical power. In fact, the production and operating costs of the RF detectors are such that most RF imaging systems must typically employ scanning techniques to enable them to produce images with only a one-dimensional (1D) array of detectors or even with only one detector. Accordingly, there remains a need for a relatively inexpensive and user-friendly RF imaging system.

SUMMARY

In view of the foregoing, an embodiment herein provides a RF to optical converter for RF imaging, wherein the converter comprises an array of RF antenna pixels adapted to receive RF signals, wherein the RF antenna pixels are adapted to facilitate RF resonance of the received RF signals; a photonic band gap (PBG) layer connected to the array of RF antenna pixels, the PBG layer comprising at least two materials arranged in a photonic crystal (PC), wherein at least one of the materials comprises an electro-optic (EO) material, wherein the EO material is adapted to use the RF resonant signals to produce changes in optical properties of the EO material, and wherein the PC is adapted to use changes in optical properties of the EO material to produce enhanced changes in optical properties of the PBG layer; and an RF ground plane connected to the PBG layer. Preferably, the use of the RF resonant signals comprises any of reflecting the optical light, transmitting the optical light, and a combination of both. Preferably, the optical properties comprise any of absorption, reflection, and phase delay. The converter further comprises at least one RF imaging system adapted to image the RF signals onto the array of RF antenna pixels.

The converter may further comprise at least one optical imaging system adapted to illuminate the PBG layer with optical light and process either or both of the reflected and transmitted light in order to form optical images, wherein the optical images form a one-to-one correspondence with the RF signals. Preferably, the PBG layer comprises a spatial repetition of the at least two materials. Additionally, the converter may further comprise a prism adjacent to the RF ground plane.

Another embodiment provides a system for converting RF signals to optical images, wherein the system comprises a patch of RF antenna pixels adapted to receive RF signals, wherein the patch of RF antenna pixels are adapted to facilitate RF resonance of the received RF signals; at least one RF imaging system adapted to image the RF signals onto the patch of RF antenna pixels; a PBG layer connected to the patch of RF antenna pixels, the PBG layer comprising at least two materials arranged in a PC, wherein at least one of the materials comprises an EO material, wherein the EO material is adapted to use the RF resonant signals to produce changes in optical properties of the EO material, and wherein the PC is adapted to use changes in optical properties of the EO material to produce enhanced changes in optical properties of the PBG layer; an RF ground plane connected to the PBG layer; an optical source adapted to transmit optical light; and at least one optical imaging system adapted to illuminate the PBG layer with optical light and process either or both of reflected and transmitted light in order to form optical images, wherein the optical images form a one-to-one correspondence with the RF signals.

Moreover, the use of the RF resonant signals comprises any of reflecting the optical light, transmitting the optical light, and a combination of both. Preferably, the optical properties comprise any of absorption, reflection, and phase delay. Additionally, the PBG layer preferably comprises a spatial repetition of the at least two materials. Furthermore, the system may comprise a prism adjacent to the RF ground plane. Also, the system may further comprise a pair of optical imaging systems and a beam splitter adapted to split the optical light to the pair of optical imaging systems. Moreover, the beam splitter may comprise any of a cube and a plate. Additionally, the system may further comprise an optical mirror and a beam splitter adapted to split the optical light to the at least one optical imaging system and the optical mirror.

Another embodiment provides a method of converting RF signals to optical images, wherein the method comprises receiving RF signals through an array of RF antenna pixels; receiving optical light from a transmitting optical system; sending the RF signals and the optical light both into a PBG layer sandwiched between the array of RF antennal pixels and a RF ground plane, the PBG layer comprising at least two materials arranged in a PC, wherein at least one of the materials comprises an EO material, wherein the EO material is adapted to use the RF resonant signals to produce changes in optical properties of the EO material, and wherein the PC is adapted to use changes in optical properties of the EO material to produce enhanced changes in optical properties of the PBG layer; and creating an optical image from the optical light exiting the PBG layer. Preferably, the use of the RF resonant signals comprises any of reflecting the optical light, transmitting the optical light, and a combination of both.

Additionally, the method may further comprise imaging the RF signals onto the array of RF antenna pixels. Preferably, the optical properties comprise any of absorption, reflection, and phase delay. Also, the method may further comprise processing either or both of the reflected and transmitted light in order to form optical images, wherein the optical images form a one-to-one correspondence with the RF signals. Moreover, the method may further comprise splitting the optical light to a pair of optical detectors. Furthermore, the method may further comprise splitting the optical light to the at least one optical detector and an optical mirror. Also, the method may further comprise shifting an output direction of the optical light. Additionally, the enhanced changes in the optical properties of the PBG layer comprise an enhancement of at least a factor of ten.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
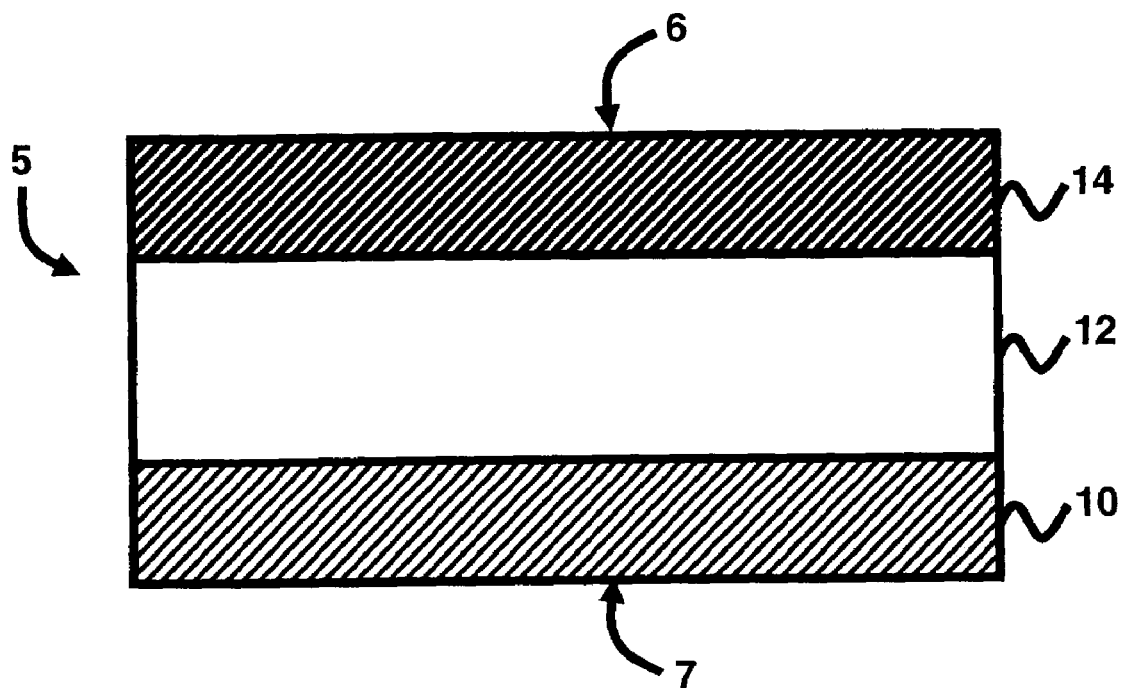
FIG. 1 is a schematic cross-sectional diagram illustrating a RF to optical converter according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a relatively inexpensive and user-friendly RF imaging system. The embodiments herein achieve this by providing a RF to optical converter for RF imaging with optical sensors. Referring now to the drawings, and more particularly to FIGS. 1 through 6, where similar reference characters denote corresponding features consistently throughout the figures, there are shown preferred embodiments.

The embodiments herein utilize the electro-optic (EO) effect, in which an electric field changes the optical refractive index of a material. Materials have been developed recently that have a very high EO coefficient coupled with an ability to respond very quickly, even at frequencies in the RF regime (e.g., 100 GHz). In the embodiments herein, the RF provides the electric field, which the EO material converts into a change in the optical refractive index. This refractive index change can be interrogated using light at optical wavelengths (visible or near-IR, such as telecommunications wavelengths). The 100 GHz (i.e., $10^{11}$) variation is much slower than the optical frequency, which is on the order of PHz (i.e., $10^{15}$ Hz).

When two or more materials with different refractive indices are periodically arranged in one, two, or three dimensions, the resulting anisotropic structure is called a photonic crystal (PC). If appropriate geometric parameters are chosen, the PC may have one or more directions in which light cannot propagate if its wavelength is within a certain range. This is known as a photonic band gap (PBG), in analogy with the electronic band gaps of solid-state physics. Strictly speaking, PCs are generally infinite in extent, however in practice it has been found that a limited number of repeat units (i.e., unit cells or periods) can produce pseudo-PBGs. The reflectivity of pseudo-PCs can be nearly 100% within the pseudo-PBG, and it is common practice not to use the "pseudo" prefix in most cases.

FIG. 1 illustrates an overview of a RF to optical converter 5 according to the embodiments herein, wherein the RF to optical converter 5 comprises an RF ground plane 10 and RF patch antenna pixels 14 sandwiching an optical PBG structure 12 comprising at least two materials with at least one material being an EO material, embedded within an RF cavity. Within the context of the embodiments herein, materials with the same physical composition but different material alignments are considered to be different materials.

The embodiments herein are preferably suited for use in a two-dimensional (2D) array. In a 2D embodiment, the embodiments herein provide a direct conversion of an RF image into an optical image with a passive 2D focal plane array receiver plate RF to optical converter 5. On the front side 6 of the RF to optical converter 5, the RF image is focused on a 2D pixel array of patch antenna pixels 14. The RF resonance occurs in the middle PBG layer 12 formed by a high performance EO dielectric material between the patch antenna pixels 14 and the ground plane layer 10. In order to increase the sensitivity for the optical change, the EO material is artificially made into a PC structure with a band gap near or at the optical wavelength (may or may not be a single wavelength) used for readout. Optical light incident on the back side 7 of the RF to optical converter 5 is preferentially reflected or transmitted (depending on the geometry and application) at pixels with a larger RF field strength and is imaged onto a 2D array of optical detectors (not shown in FIG. 1), such as a digital optical camera. The RF image is thereby converted to an optical image.

Figure 2:
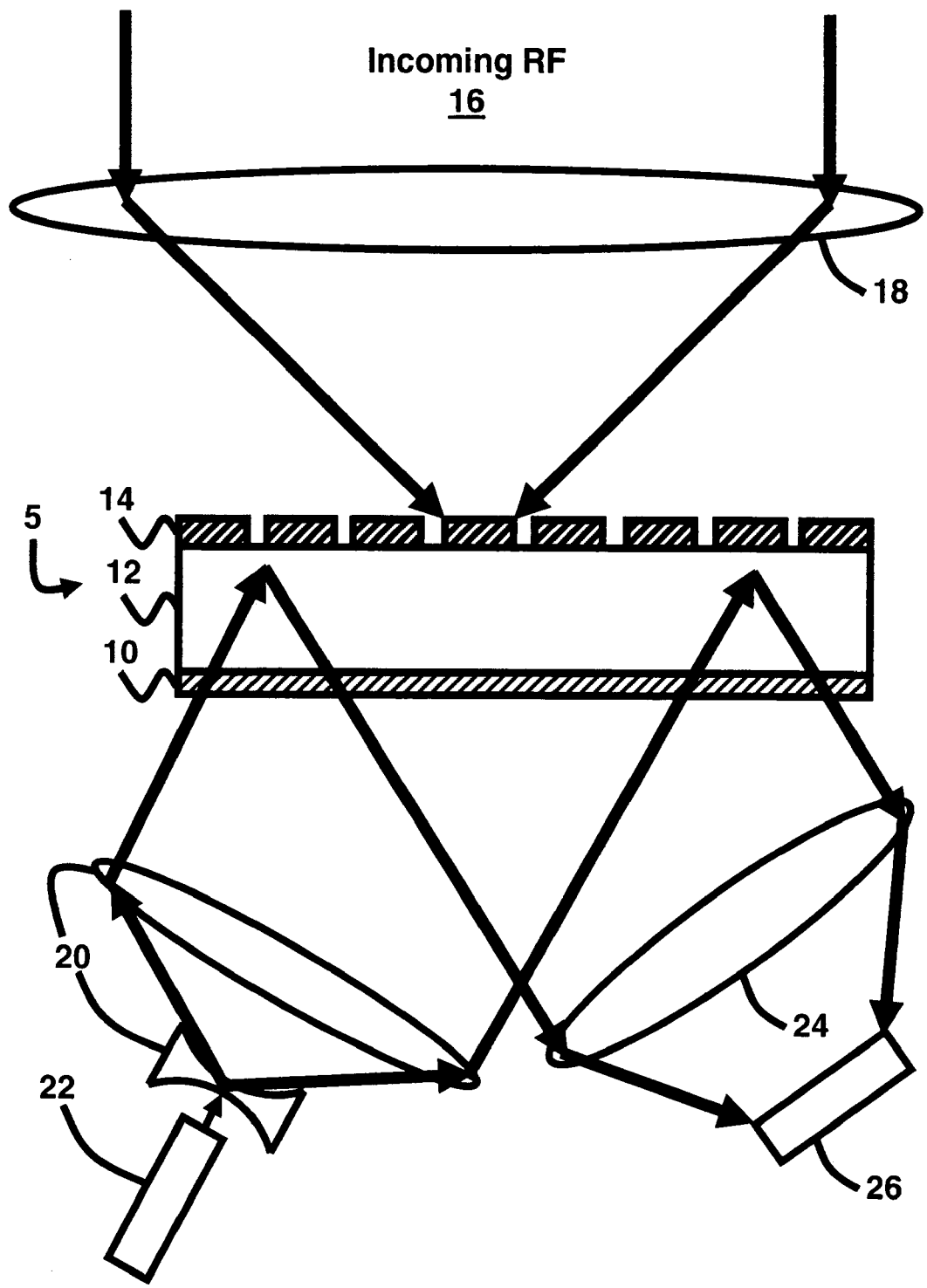
FIG. 2 is a schematic cross-sectional diagram illustrating a first embodiment of the RF to optical converter of FIG. 1 according to the embodiments herein.

In the first embodiment shown in FIG. 2, an interceding RF imaging system 18, which may be embodied as an RF objective lens, images the incoming RF signal 16 onto the RF converter cavity 5. The RF converter cavity 5 comprises the array of RF patch antenna pixels 14 combined with the PBG layer 12 and RF ground plane 10. The imaging of the RF is schematically depicted with arrows in FIGS. 2 through 4, and the optical PC (PBG structure 12) is schematically depicted as a one dimensional (1D) repetition of layers of two materials, one or both of which is an EO material. Again with respect to FIG. 2, the optical source 22 comprises a narrow-band source such as a laser, and may be tunable. The optical source imaging system 20 may be embodied as a pair of lenses that expand and collimate the source light. The optical light interacts with the PC (PBG structure 12), and the reflectivity of each pixel depends upon the RF field at each RF patch antenna pixel 14. The pixels 14 are imaged onto the optical detector 26 by the optical detector imaging system 24, which may be embodied as an objective lens. For example, the optical detector 26 could be embodied as a charge-coupled device (CCD) detector array (similar to those used in off-the-shelf digital cameras), a complementary metal oxide semiconductor (CMOS) array, a specially-made detector array, a scanned (p-type, intrinsic, n-type diode) PIN photodiode, or any other appropriate optical detector including photographic film.

Figure 3:
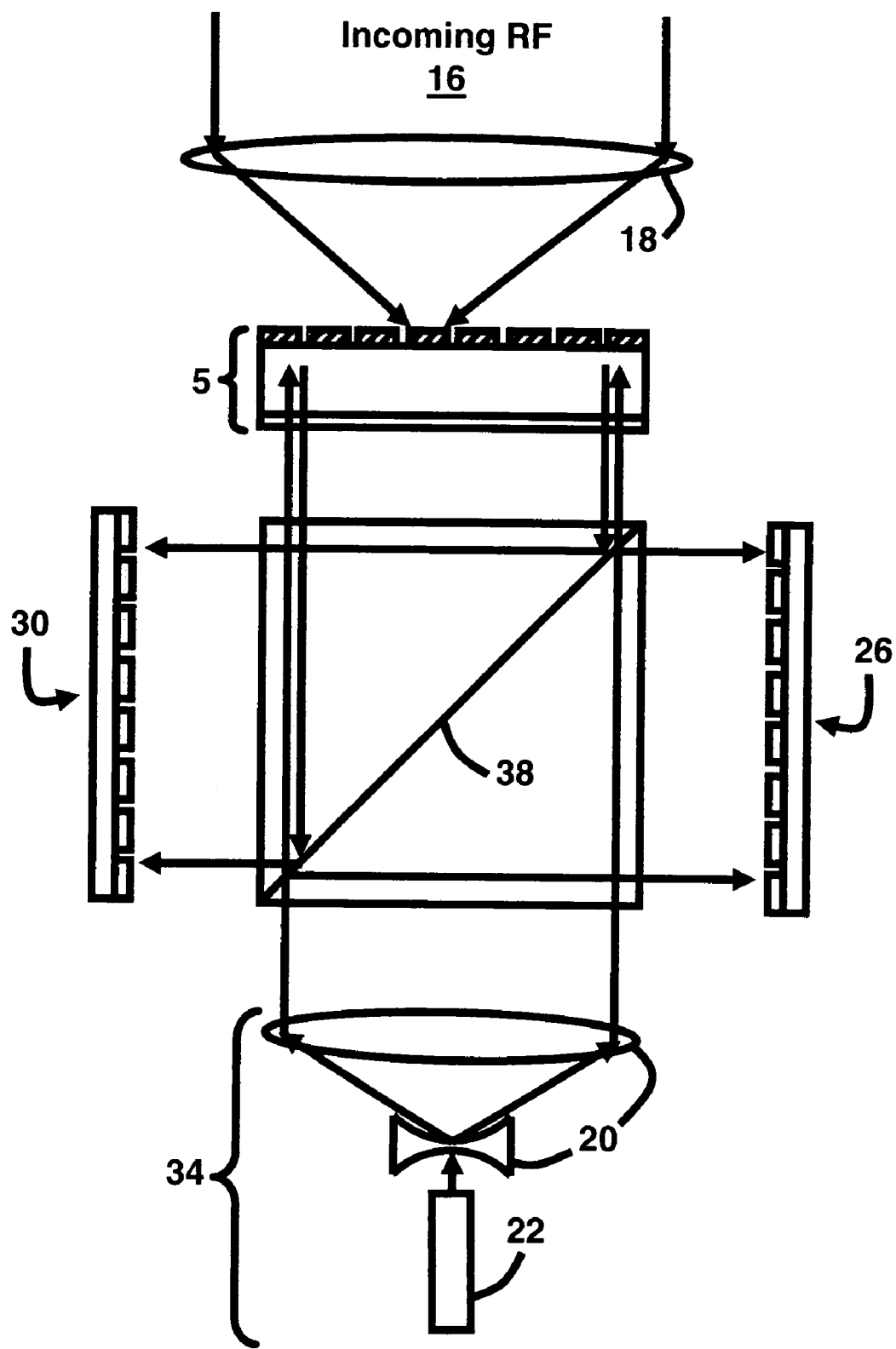
FIG. 3 is a schematic cross-sectional diagram illustrating a second embodiment of the RF to optical converter of FIG. 1 according to the embodiments herein.

The second embodiment shown in FIG. 3 is similar to the first embodiment of FIG. 2 except the second embodiment of FIG. 3 further includes a beam splitter 38, which may be embodied as a cube, plate, etc., and another optical detector. Part of the optical light from the optical source system 34 goes immediately to the first optical detector 26. Another part of the optical light from the optical source system 34 interacts with the PC of the PBG layer 12 and goes to the second optical detector 30. The readout from the first optical detector 26 can be used as a reference and subtracted from the readout of the second optical detector 30 in order to increase the sensitivity and dynamic range of the RF detection of the system. Moreover, there may be other imaging elements that are not shown in FIG. 2, which would allow independent choice of the sizes of the various elements shown. For example, the optical detectors 26, 30 and the beam splitter 38 may have a much smaller width than the RF to optical converter 5.

Figure 4:
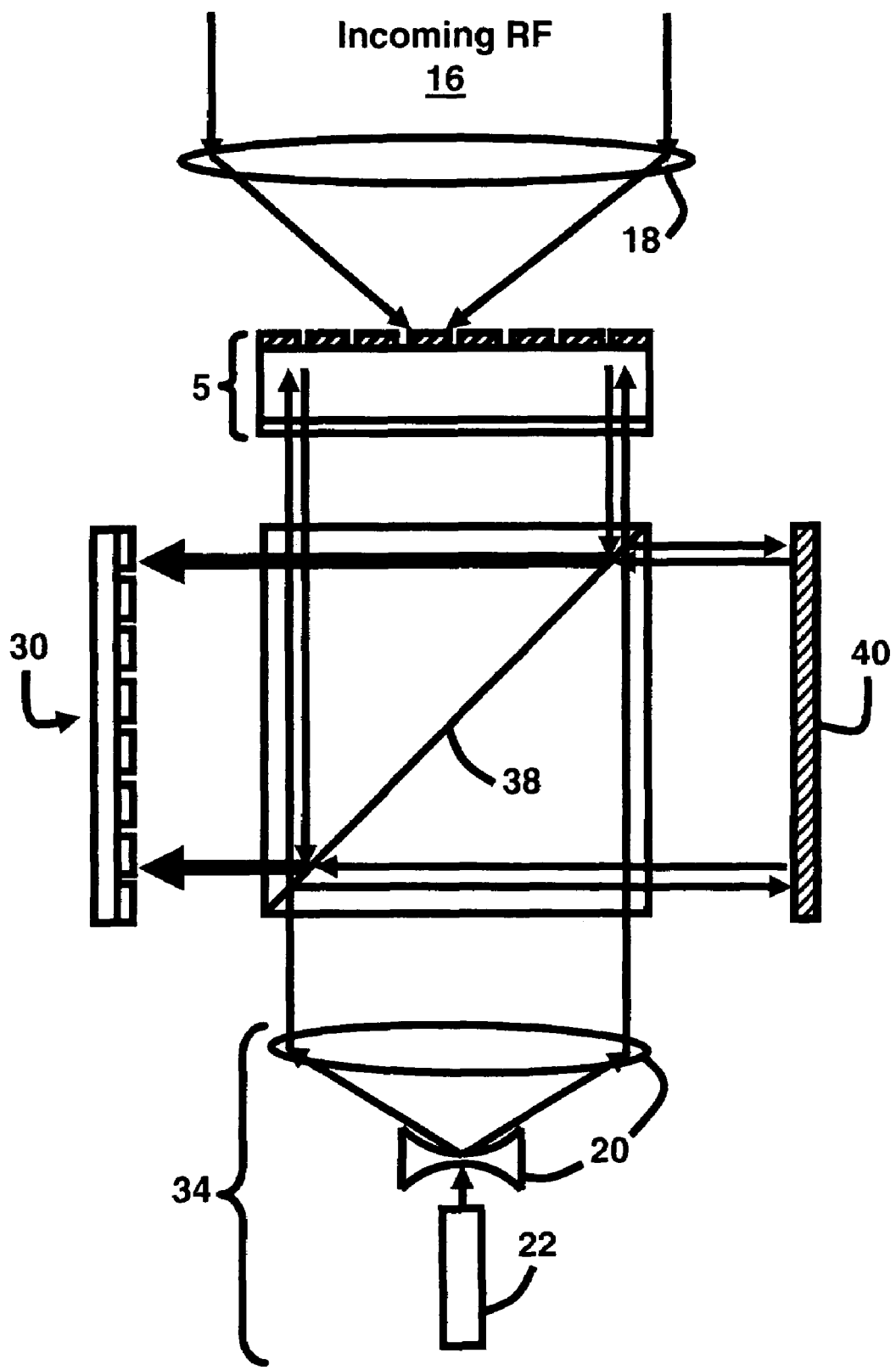
FIG. 4 is a schematic cross-sectional diagram illustrating a third embodiment of the RF to optical converter of FIG. 1 according to the embodiments herein.

The third embodiment shown in FIG. 4 is similar to the second embodiment of FIG. 3 except the third embodiment substitutes a mirror 40 for the first optical detector 26 of FIG. 3. Part of the optical light from the optical source system 34 goes immediately to the mirror 40, from which the optical light reflects and goes to the optical detector 30. This is the reference beam. The other part of the optical light from the optical source system 34 interacts with the PC of the PBG layer 12 and goes to the optical detector 30. This is the signal channel. The reference and signal channels interfere at the optical detector 30, allowing extraction of the RF image with reduced electronic signal processing. This embodiment shows one example of how RF-induced phase changes in the optical light can be measured as well as RF-induced magnitude changes.

Figure 5:
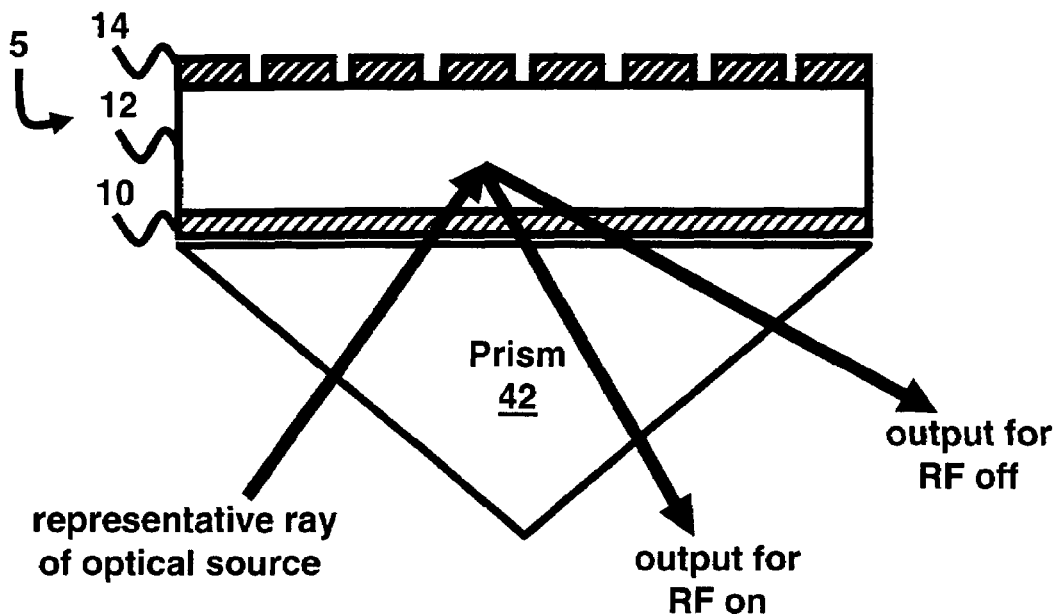
FIG. 5 is a schematic cross-sectional diagram illustrating a fourth embodiment of the RF to optical converter of FIG. 1 according to the embodiments herein.

The fourth embodiment shown in FIG. 5 is similar to the first embodiment of FIG. 2 except the fourth embodiment includes a prism 42. For clarity, most of the elements repeated from the first embodiment of FIG. 2 are not shown in FIG. 5.

The general difference is that the RF interaction with the EO PBG structure 12 primarily causes a shift in the output direction of the optical light rather than primarily in its magnitude or phase. The direction shift is caused by the so-called "superprism" effect.

Figure 6:
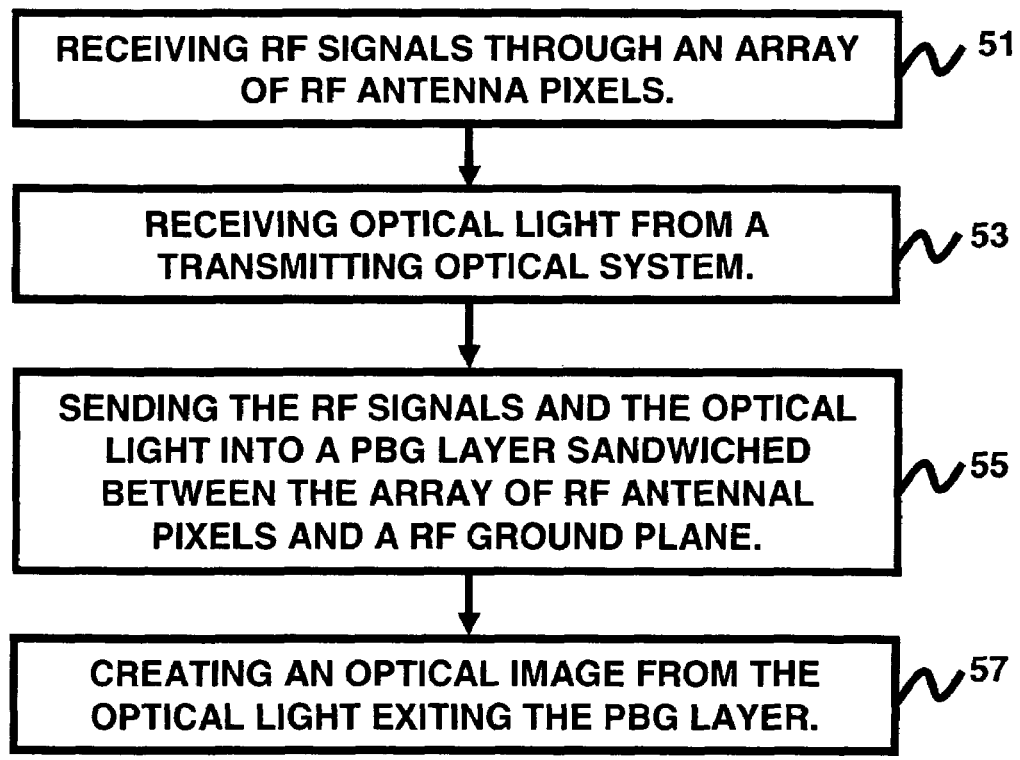
FIG. 6 is a flow diagram illustrating a preferred method according to the embodiments herein.

FIG. 6 (with reference to FIGS. 1 through 5) is a flow diagram illustrating a method of converting RF signals 16 to optical images according to an embodiment herein, wherein the method comprises receiving (51) RF signals 16 through an array of RF antenna pixels 14; receiving (53) optical light from a transmitting optical system 20; sending (55) the RF signals 16 and the optical light both into a PBG layer 12 sandwiched between the array of RF antennal pixels 14 and a RF ground plane 10, the PBG layer 12 comprising at least two materials arranged in a PC, wherein at least one of the materials comprises an EO material, wherein the EO material is adapted to use the RF resonant signals to produce changes in optical properties of the EO material, and wherein the PC is adapted to use changes in optical properties of the EO material to produce enhanced changes in optical properties of the PBG layer 12; and creating (57) an optical image from the optical light exiting the PBG layer 12. Preferably, the use of the RF resonant signals comprises any of reflecting the optical light, transmitting the optical light, and a combination of both. Furthermore, the PBG layer 12 preferably comprises a spatial repetition (for example, a one-, two-, or three-dimensional repetition) of the at least two materials.

Additionally, the method may further comprise imaging the RF signals 16 onto the array of RF antenna pixels 14. Preferably, the optical properties comprise any of absorption, reflection, and phase delay. Also, the method may further comprise processing either or both of the reflected and transmitted light in order to form optical images, wherein the optical images form a one-to-one correspondence with the RF signals. Moreover, the method may further comprise splitting the optical light to a pair of optical detectors 26, 30. Furthermore, the method may further comprise splitting the optical light to the at least one optical detector 26 and an optical mirror 40. Also, the method may further comprise shifting an output direction of the optical light. Additionally, the enhanced changes in the optical properties of the PBG layer 12 comprises an enhancement of at least a factor of ten.

The embodiments herein provide a RF to optical converter device 5 that passively converts RF signals into a change, either in magnitude or phase or polarization or a combination thereof, in reflectivity from (and/or transmission through) a PBG structure 12, wherein the PBG structure 12 is fabricated from at least two different materials, at least one of which is an EO material (i.e., has an EO coefficient at least greater than 0.1 pm/V, and preferably greater than 100 pm/V), and the reflectivity (and/or transmission) change being in the optical regime (e.g., visible, IR) and therefore measurable in one or more of a variety of ways using an optical source system 34 and optical detectors 26, 30.

According to different embodiments, the entire RF to optical converter device 5 may be embodied as a single converter, or a linear array of converters, or a two-dimensional array of converters. The RF to optical converter device 5 can be made in sections to improve fabrication yield. Moreover, the PBG structure 12 may be one-, two-, or three-dimensional. The collection of long-wavelength radiation may be accomplished or enhanced using one or more horns, and/or antennae, and/or cavities. Furthermore, the material used for the RF antenna pixels 14 and the RF ground plane 10 may be metal or some other conductor, and it may be a material that is transparent to optical wavelengths (e.g., indium tin oxide).

The PBG change may be determined in a variety of ways, for example by measuring the intensity change at a single optical detector 26, or the intensity difference at two optical detectors 26, 30, or the intensity of optically-interfered light that has followed two paths to a single optical detector 26, or the angular deviation induced by the super-prism effect (using prism 42). The optical detection may be accomplished in a variety of ways, for example film, CCD arrays, digital cameras, photodiodes, etc. The overall system provided by the embodiments herein may include additional elements, such as for imaging (e.g., lenses, mirrors), or scanning (e.g., rotating mirrors), or balancing or tuning (e.g., phase retarders, filters), or signal enhancement (e.g., choppers, averagers, lock-in amplifiers).

Rather than down converting the RF to lower frequencies using expensive electronics, the electric field of the RF is used to induce changes in the optical properties of the EO-material-comprising PBG layer 12, which is entirely passive. These optical property changes affect the propagation of optical light, and this can be measured with relatively inexpensive optical systems 20. Generally, the RF image is up converted in parallel to an optical image. However, this is not a nonlinear optical process; the RF light is not being combined with or converted to optical light, and it does not affect the frequency of the optical light being used for readout. Moreover, although the optical image will still vary periodically at the RF frequency, the optical systems 20 will automatically time-average this signal over many RF periods.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A radio frequency (RF) to optical converter for RF imaging, said converter comprising:
    an array of RF antenna pixels adapted to receive RF signals, wherein said RF antenna pixels are adapted to facilitate RF resonance of the received RF signals;
    a photonic band gap (PBG) layer connected to said array of RF antenna pixels, said PBG layer comprising at least two materials arranged in a photonic crystal (PC), wherein at least one of the materials comprises an electro-optic (EO) material, wherein the EO material is adapted to use the RF resonant signals to produce changes in optical properties of said EO material, and wherein said PC is adapted to use changes in optical properties of said EO material to produce enhanced changes in optical properties of said PBG layer; and
    an RF ground plane connected to said PBG layer.

2. The converter of claim 1, wherein the use of said RF resonant signals comprises any of reflecting said optical light, transmitting said optical light, and a combination of both.

3. The converter of claim 1, further comprising at least one RF imaging system adapted to image said RF signals onto said array of RF antenna pixels.

4. The converter of claim 1, wherein said optical properties comprise any of absorption, reflection, and phase delay.

5. The converter of claim 2, further comprising at least one optical imaging system adapted to illuminate said PBG layer with optical light and process either or both of said reflected and transmitted light in order to form optical images, wherein said optical images form a one-to-one correspondence with said RF signals.

6. The converter of claim 1, wherein said PBG layer comprises a spatial repetition of said at least two materials.

7. The converter of claim 1, further comprising a prism adjacent to said RF ground plane.

8. A system for converting radio frequency (RF) signals to optical images, said system comprising:
    a patch of RF antenna pixels adapted to receive RF signals, wherein said patch of RF antenna pixels are adapted to facilitate RF resonance of the received RF signals;
    at least one RF imaging system adapted to image said RF signals onto said patch of RF antenna pixels;
    a photonic band gap (PBG) layer connected to said patch of RF antenna pixels, said PBG layer comprising at least two materials arranged in a photonic crystal (PC), wherein at least one of the materials comprises an electro-optic (EO) material, wherein the EO material is adapted to use the RF resonant signals to produce changes in optical properties of said EO material, and wherein said PC is adapted to use changes in optical properties of said EO material to produce enhanced changes in optical properties of said PBG layer;
    an RF ground plane connected to said PBG layer;
    an optical source adapted to transmit optical light; and
    at least one optical imaging system adapted to illuminate said PBG layer with optical light and process either or both of reflected and transmitted light in order to form optical images, wherein said optical images form a one-to-one correspondence with said RF signals.

9. The system of claim 8, wherein the use of said RF resonant signals comprises any of reflecting said optical light, transmitting said optical light, and a combination of both.

10. The system of claim 8, wherein said optical properties comprise any of absorption, reflection, and phase delay.

11. The system of claim 8, wherein said PBG layer comprises a spatial repetition of said at least two materials.

12. The system of claim 8, further comprising a prism adjacent to said RF ground plane.

13. The system of claim 8, further comprising:
    a pair of optical imaging systems; and
    a beam splitter adapted to split said optical light to said pair of optical imaging systems.

14. The system of claim 13, wherein said beam splitter comprises any of a cube and a plate.

15. The system of claim 8, further comprising:
    an optical mirror; and
    a beam splitter adapted to split said optical light to said at least one optical imaging system and said optical mirror.

16. A method of converting radio frequency (RF) signals to optical images, said method comprising:
    receiving RF signals through an array of RF antenna pixels;
    receiving optical light from a transmitting optical system;
    sending said RF signals and said optical light both into a photonic band gap (PBG) layer sandwiched between said array of RF antennal pixels and a RF ground plane, said PBG layer comprising at least two materials arranged in a photonic crystal (PC), wherein at least one of the materials comprises an electro-optic (EO) material, wherein the EO material is adapted to use the RF resonant signals to produce changes in optical properties of said EO material, and wherein said PC is adapted to use changes in optical properties of said EO material to produce enhanced changes in optical properties of said PBG layer; and creating an optical image from said optical light exiting said PBG layer.

17. The method of claim 16, wherein the use of said RF resonant signals comprises any of reflecting said optical light, transmitting said optical light, and a combination of both.

18. The method of claim 16, further comprising imaging said RF signals onto said array of RF antenna pixels.

19. The method of claim 16, wherein said optical properties comprise any of absorption, reflection, and phase delay.

20. The method of claim 17, further comprising processing either or both of the reflected and transmitted light in order to form optical images, wherein said optical images form a one-to-one correspondence with said RF signals.

21. The method of claim 16, further comprising splitting said optical light to a pair of optical detectors.

22. The method of claim 16, further comprising splitting said optical light to said at least one optical detector and an optical mirror.

23. The method of claim 16, further comprising shifting an output direction of said optical light.

24. The method of claim 16, wherein said enhanced changes in said optical properties of said PBG layer comprises an enhancement of at least a factor of ten.

* * * * *